No. 845,436.  
PATENTED FEB. 26, 1907.
J. J. RUSSELL, Jr.  
STORM SHIELD FOR VEHICLES.  
APPLICATION FILED JULY 13, 1906.
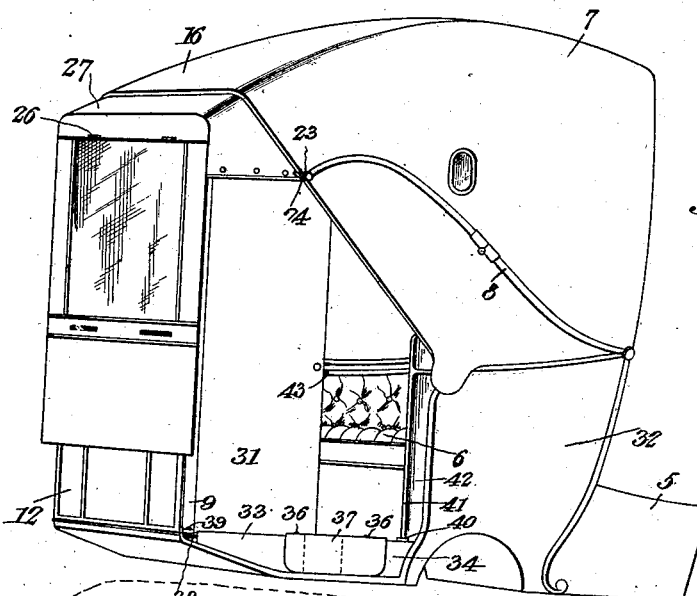
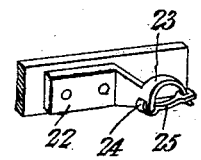
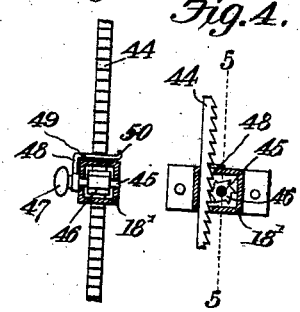
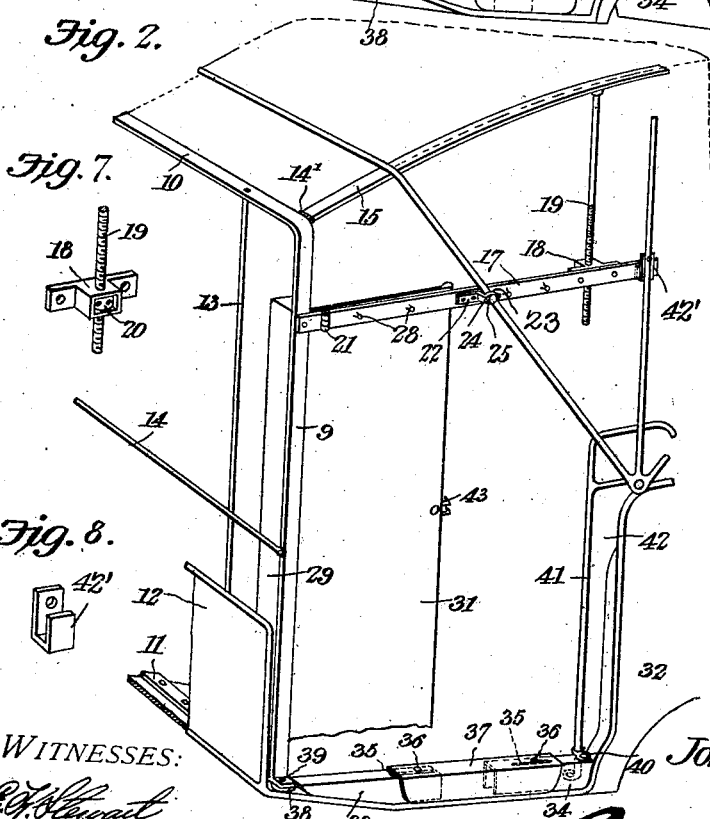
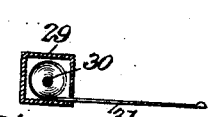
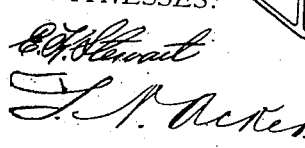
John J. Russell Jr.,  
INVENTOR
By C. A. Snow & Co.  
ATTORNEYS

UNITED STATES PATENT OFFICE.

JOHN J. RUSSELL, JR., OF DEEPWATER, MISSOURI.

STORM-SHIELD FOR VEHICLES.

No. 845,436.  Specification of Letters Patent.  Patented Feb. 26, 1907.

Application filed July 13, 1906. Serial No. 326,151.

*To all whom it may concern:*

Be it known that I, JOHN J. RUSSELL, Jr., a citizen of the United States, residing at Deepwater, in the county of Henry and State of Missouri, have invented a new and useful Storm-Shield for Vehicles, of which the following is a specification.

This invention relates to storm fronts or shields for buggies, phaetons, cabriolets, and other vehicles, and has for its object to provide a comparatively simple and inexpensive device of this character by means of which an open-front vehicle may be conveniently transformed into a vehicle possessing all the advantages of a closed carriage.

A further object of the invention is to provide a storm front or shield capable of being quickly attached to or removed from the vehicle and which may be compactly folded for transportation or shipment.

A further object is to provide means for adjusting the shield vertically with respect to the overhanging hood of the vehicle, and, further, to provide an adjustable foot-rail designed for attachment to phaetons and similar vehicles having their side panels curved downwardly at the front of the seat, so as to form an effectual closure at each side of the vehicle.

A still further object of the invention is to generally improve this class of devices so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a perspective view of a vehicle-body provided with a storm front or shield constructed in accordance with my invention. Fig. 2 is a similar view of a portion of the frame and hood with the covering removed, so as to show the construction of the supporting-frame. Fig. 3 is a transverse sectional view of a portion of the frame, showing the construction of the roller-casing. Fig. 4 is a longitudinal sectional view illustrating a different manner of adjusting the hood of the shield. Fig. 5 is a transverse sectional view taken on the line 5 5 of Fig. 4. Fig. 6 is an enlarged detail perspective view of the spring-clip. Fig. 7 is a perspective view of the casing or housing and a portion of the adjusting-screw detached. Fig. 8 is a similar view of the auxiliary supporting-clip detached.

Similar numerals of reference indicate corresponding parts in all of the figures of the drawings.

The improved storm front or shield is principally designed for use on phaetons, cabriolets, stanhopes, and other vehicles having their side panels curved downwardly at the front of the seat and by way of illustration is shown applied to a vehicle of the ordinary construction, in which 5 designates the body portion, 6 the seat, and 7 the top, supported by the folding levers or props 8, as shown.

The shield comprises a main supporting-frame consisting of parallel uprights 9, connected at their upper ends by a transverse bar 10 and at their lower ends by a similar bar 11, the latter being bolted or otherwise rigidly secured to the bed of the vehicle at the rear of the dashboard 12. The frame is reinforced and strengthened by longitudinal and transverse rods or bars 13 and 14 and pivoted to the upper transverse bar 10 of the frame, as indicated at 14', are a pair of spaced arms 15, which extend laterally from one side of the frame and bear against the under side of the hood 16 of the vehicle-top.

Secured in any suitable manner to the uprights 9 are laterally-extending side bars 17, the free ends of which extend within the front of the vehicle-top and are provided with housings or casings 18 for the reception of threaded rods 19. The rods 19 are secured in any suitable manner to the arms 15, and disposed within the casing and engaging the threads on the rods 19 are suitable nuts 20, by means of which the rods may be adjusted vertically, so as to cause the arms 15 to bear against the adjacent surface of the hood of the vehicle. The side rails 17 are preferably formed in two sections hinged together at 21, and secured to each rail is a bracket 22, having a portion thereof bent laterally to form a socket 23 for engagement with the adjacent prop of the buggy-top frame. Pivoted at 24 to the bracket 22 is a spring-latch 25, the free end of which is adapted to engage the adjacent end of the socket 23, and thus lock the side rails against longitudinal movement.

The main supporting-frame is covered with a strip of rubber, canvas, or other waterproof material, the free edge of which overlaps the adjacent end of the dashboard 12, so as to prevent the rain from beating in from the top of the dash, said waterproof covering being provided with a suitable opening or window pivotally mounted for swinging movement at 26 and preferably formed of isinglass or other transparent material. The hinged arms 15 are also covered with a strip of waterproof material to form a hood 27, the side edges of the material forming the hood being detachably secured to the buttons or clips 28, extending laterally from the side rails 17, as shown, whereby said hood or cover may be readily detached when it is desired to fold the frame for transportation or shipment.

Secured in any suitable manner to the uprights 9 are longitudinal casings or housings 29, in which are seated spring-actuated rollers 30, to which are attached flexible curtains 31, designed to close the openings on each side of the vehicle. The casing 29 entirely incloses the roller with the exception of a longitudinal slot or opening to permit the passage of the curtain, thus preventing the wind and rain from beating in at the sides of the vehicle.

Disposed on each side of the vehicle, between the dash 12 and the lower ends of the side panels 32, are suitable foot-rails, which in connection with the side rails 17 form a substantially rectangular opening on each side of the vehicle, which are designed to be closed by the curtains 31, as before stated. The foot-rails are preferably formed in a plurality of sections, the end sections 33 and 34 being formed with elongated slots 35, adapted to receive bolts or similar fastening devices 36, carried by the intermediate telescoping section 37. The base of the section 33 is inclined to conform to the inclination of the floor of the vehicle and is provided with a terminal loop 38, seated beneath the lateral flange of the adjacent upright 9 and secured to the floor of the vehicle, as by a clamping-bolt 39.

Spaced from the upright 9 and bolted or otherwise secured to the bed of the vehicle is a vertical rod or upright 41, preferably disposed a short distance in advance of the seat 6, and to which is attached a stationary curtain or covering 42, the section 34 of the foot-rail being detachably secured to the upright 41 in any suitable manner, as by a hook or similar fastening device 40. If desired, however, the rod 41 may be extended vertically and attached in any suitable manner to the hood of the vehicle-top or to the side rails 17. When the rod or upright 41 terminates short of the side rails 17, some of the props of the vehicle-top will be provided with clips or supports 42', adapted to receive the inner ends of said side rails to assist in supporting the same on the vehicle-top, as best shown in Fig. 2 of the drawings. It will thus be seen that the upper edge of the curtain bears against the inner face of the side rails 17, while the lower end thereof engages the foot-rail, and that the hood 27 overlaps the outer face of the side rails, thus forming a perfect closure for the side entrance of the carriage. The free end of the curtain 31 is provided with a hook or similar fastening device 43, adapted to engage the vertical bar 41 when the curtain is moved to closed position, the closure 42 forming, in effect, a continuation of the curtain, and thus preventing the snow or rain from entering the vehicle at the panels 32 and wetting or otherwise injuring the seat. By having the side rails 17 formed with threaded rods the arms 15 of the hood or extension 27 may be adjusted vertically in contact with the adjacent face of the buggy-top, while by having said arms and rails hinged in the manner described the frame may be readily detached and compactly folded, so as to take up very little space when not in use.

In Figs. 4 and 5 of the drawings there is illustrated a modified form of the invention, in which the adjustment of the hood 27 is effected by means of vertical rack-bars 44, slidably mounted for vertical movement in casings or housings 18', secured in any suitable manner to the side rails 17. Journaled in the casing 18' is a spindle 45, provided with a ratchet-wheel 46, adapted to engage the teeth on the rack-bar 44 when the terminal operating-handle 47 is rotated. As a means for locking the rack-bars in adjusted position there is provided a spring-bolt 48, loosely mounted on the spindle 45 and yieldably held in engagement with the teeth on the rack-bar by means of a lug or projection 49, said pawl being formed with a terminal lip or finger-piece 50, by means of which the bolt may be moved to inoperative position when it is desired to lower the rack-bar.

It will of course be understood that the curtains can be arranged on either one or both sides of the vehicle and that any particular construction of hood and hood-adjusting means may be employed. It will also be understood that the storm-shield may be used in connection with different styles of vehicles and that the supporting-frame may be supported on the vehicle in different ways, according to the style of vehicle in connection with which the shield is used.

Attention is called to the fact that by having the brackets 22 attached to the side bars 17, with the hooks 23 engaging the adjacent prop of the vehicle-top, when the rod 19 or rack-bar 44 is adjusted vertically the hood 27 will be forced upwardly against the vehicle-top, while at the same time the hook 23 will exert a downward pressure on the adjacent prop, thus firmly securing the hood or shield in position on the vehicle. It will thus be seen that the rod 19 and hook 23 form the means of connecting the shield or hood to the upper part of the vehicle-top and also serve as a means for adjusting the shield vertically in contact with the hood of the vehicle.

From the foregoing description it is thought that there is provided an extremely simple, inexpensive, and efficient device admirably adapted for the attainment of the ends in view.

Having thus described the invention, what is claimed is—

1. A storm-shield for vehicle-tops comprising a frame, a hood carried by the frame and adapted to engage the top of the vehicle, and a sectional foot-rail associated with the frame.

2. A storm-shield for vehicle-tops comprising a frame, an adjustable hood pivotally mounted on the frame and adapted to engage the top of the vehicle, means for locking the hood in adjusted position, and telescopic members associated with the frame and forming an adjustable foot-rail.

3. A storm-shield for vehicle-tops comprising a frame provided with a laterally-extending hood, side bars pivoted to the frame and forming a portion of the hood, a sectional foot-rail associated with the frame, and a curtain adapted to close the opening between the side bars and foot-rails.

4. A storm-shield for vehicle-tops comprising a frame, arms pivoted to the frame, side rails carried by the frame and spaced from said arms to form an opening, a covering engaging the arms and side rails and forming a hood adapted to engage the top of the vehicle, means carried by the side rails for adjusting the hood in a plane perpendicular to the vehicle, means for locking the hood in adjusted position, a sectional foot-rail extending laterally from the frame, and a curtain carried by the frame and forming a closure for the opening between said rails.

5. A storm-shield for vehicle-tops comprising a frame, a hood secured to the frame and adapted to engage the top of the vehicle, a sectional foot-rail associated with the frame and adapted to engage the bed of the vehicle, and a curtain carried by the frame and movable to operative position between the hood and foot-rail.

6. A storm-shield for vehicle-tops comprising a frame, a hood carried by the frame, a foot-rail associated with the frame and formed of a plurality of telescoping sections adapted to engage the bed of the vehicle, means for locking the sections in adjusted position, and a curtain carried by the frame and movable to operative position between the hood and foot-rail.

7. A storm-shield for vehicle-tops comprising a frame, a hood carried by the frame and adapted to engage the top of the vehicle, an upright spaced from the frame, a sectional foot-rail connecting the frame and upright and engaging the bed of the vehicle, and a curtain carried by the frame and movable to operative position between the hood and foot-rail.

8. A storm-shield for vehicle-tops comprising a frame, a hood carried by the frame, an upright spaced from the frame, a closure secured to the upright, an adjustable foot-rail extending between the upright and frame and engaging the bed of the vehicle, a curtain carried by the frame and movable to operative position between the hood and the foot-rail, and a fastening device carried by the curtain and adapted to engage the upright for locking the curtain in closed position.

9. A storm-shield for vehicle-tops comprising a frame, laterally-extending arms pivoted to the frame, side rails pivoted to said frame and spaced from the arms, a covering for the side rails and arms, respectively, and forming a hood adapted to engage the top of the vehicle, housings carried by the side rails, a threaded rod passing through the housings and engaging the lateral arms for adjusting said arms vertically, a nut for locking the rod in adjusted position, a curtain carried by the frame and movable to operative position in engagement with the side rails, and telescopic members extending laterally from the frame beneath the side rails and forming an adjustable foot-rail.

10. A storm-shield for vehicle-tops comprising a frame, laterally-extending arms pivoted to the frame, side rails spaced from the arms, a covering engaging the arms and side rails and forming a hood adapted to engage the top of the vehicle, clips carried by the side rails and adapted to engage the frame of the vehicle-top, means for adjusting the hood vertically with respect to the vehicle, a standard spaced from the frame, a sectional foot-rail connecting the standard and frame, and a curtain carried by the frame and movable to operative position between the side and foot rails.

11. A storm-shield for vehicle-tops comprising a frame, laterally-extending arms pivoted to the frame, side rails spaced from the arms and pivotally mounted on the frame, a hood covering the arms and side rails and adapted to engage the top of the vehicle, a bracket secured to the side rails and provided with a socket for the reception of one of the supporting-rods of the vehicle-top frame, a clip pivoted to the bracket and adapted to engage the socket for locking the side rails in position on the vehicle-top, a housing secured to the side rails, a threaded rod passing through the housing and engaging the lateral arm of the hood for adjusting the latter in a plane perpendicular to the vehicle, standards spaced from the frame, a foot-rail connecting the frame and standard and engaging the top of the vehicle, and a curtain carried by the frame and movable to operative position between the side and foot rails.

12. A storm-shield for vehicle-tops comprising a frame, a hood carried by the frame and adapted to engage the top of the vehicle, an upright spaced from the frame, a sectional foot-rail having its end sections provided with terminal eyes for engagement with the frame and standard, respectively, and formed with longitudinal slots, an intermediate section telescoping the end sections and provided with clamping means engaging the slots in the end sections for locking said sections in adjusted position, and a curtain movable to operative position between the side and foot rails.

13. The combination with a vehicle having a top, of a storm-shield adapted to engage the top, a hook carried by the shield for engaging with the props of said top, and means for adjusting the shield vertically and simultaneously forcing the hook downwardly in contact with the props.

14. The combination with a vehicle having a top, of a storm-shield adapted to engage the top and comprising a frame provided with laterally-extending side bars, hooks carried by the side bars for engagement with the props of the vehicle-top, and a rod associated with the side bars for adjusting the shield vertically in contact with the top and simultaneously forcing the hooks downwardly in engagement with the props.

In testimony that I claim the foregoing as my own I have hereto affixed my signature in the presence of two witnesses.

JOHN J. RUSSELL, JR.

Witnesses:
   W. H. MANBED,
   JOE HURST.